Figure 1:
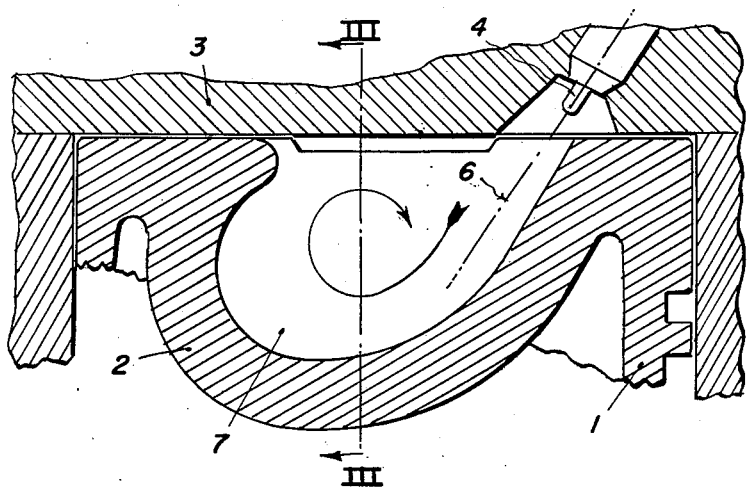

Dec. 9, 1952 — O. PETERSEN — 2,620,781
COMBUSTION SPACE IN INJECTION MOTOR ENGINES
Filed Dec. 1, 1947

INVENTOR
OVE PETERSEN,
BY Wenderoth, Lind & Ponack
ATTORNEYS

Patented Dec. 9, 1952

2,620,781

UNITED STATES PATENT OFFICE 2,620,781

COMBUSTION SPACE IN INJECTION MOTOR ENGINES

Ove Petersen, Gentofte, near Copenhagen, Denmark

Application December 1, 1947, Serial No. 789,109
In Denmark November 7, 1947

2 Claims. (Cl. 123—32)

This invention relates to internal combustion engines of the fuel injection type in general and more particularly to the formation of a fuel combustion space in the engine piston.

An object of the invention is to provide a combustion space of the above type which effects good combustion and reduces heat loss by conduction.

Another object of the invention is to provide a fuel combustion space of suitable size and shape to create favorable air circulation under compression for promoting combustion.

Other objects of the invention will be apparent from the following detailed description of the invention.

The invention is illustrated on the drawing on which

Figure 2:
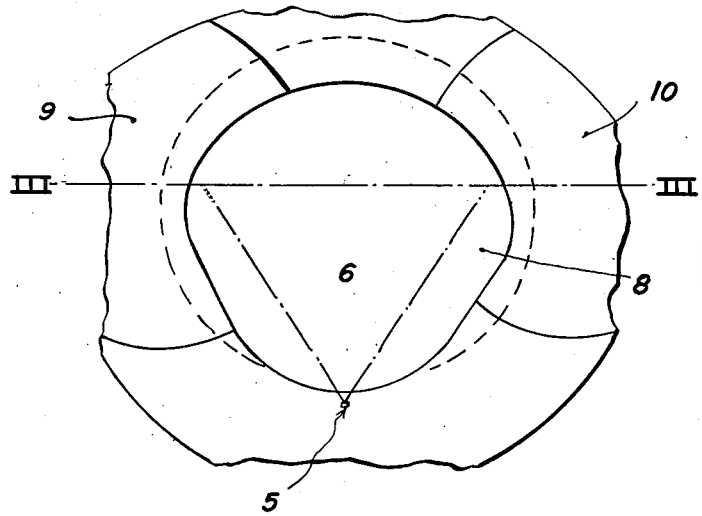
Figure 3:
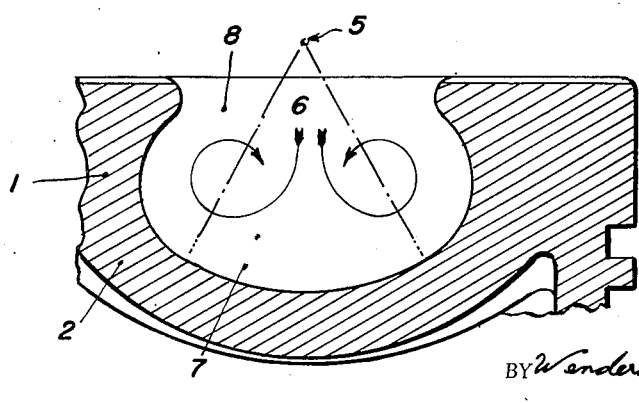

Fig. 1 in part diagrammatically shows the upper part of a piston and the adjacent parts of cylinder and cover in a motor engine cylinder with a combustion space in accordance with the invention, viewed in axial section, Fig. 2 part of the piston shown in Fig. 1 viewed from above, and Fig. 3 a section in the combustion space on line III—III in Figs. 1 and 2.

On the drawing, 1 designates the piston of the engine and 2 the top of the piston. This top may be made as a separate body inserted in the skirt of the piston, which body in that case may be made of an especially heat-resistant material.

The cover 3 of the cylinder is indicated diagrammatically in Fig. 1 where furthermore has been shown that a single atomizer 4 is placed in the cover with the atomization openings 5 lying at a distance of a little more than half the radius of the cylinder from the axis of the cylinder in a slight depression in the underside of the cover.

The piston is furthermore arranged for travelling with its upper end surface as near to the underside of the cover as permitted by mechanical regards, so that practically speaking the whole of the air charge of the cylinder will at the termination of the compression stroke be forced into the combustion space 7 situated in the piston top 2. Hereby the air charge will be put in a powerful swirling motion comprising first and foremost two parallel vortexes with their axes almost parallel to the vertical longitudinal central plane of the combustion space as indicated by arrows in Fig. 3. Furthermore a vortex will arise transversely to this as indicated by an arrow in Fig. 1 supported by the fuel injection and contributing to distributing the fuel injected quickly and completely through the whole of the combustion space.

The latter has roughly the form of a pear situated transversely in the cylinder with its point around the atomizer and its thick end around the axis of the cylinder or some distance on the opposite side of the latter in relation to the atomizer. The combustion space terminates in the upper side of the piston top 2 with a pear-shaped opening 8 which is considerably smaller in circumference than the widest contour of the combustion space, so that the bounding walls of the combustion space will for the greater part be formed by the material of the piston top 2. The atomizer 4 is arranged for yielding two slender conical fuel jets 6 which are directed obliquely downwards substantially parallel to or slightly more steeply than the declining part of the bottom of the combustion space in the vicinity of the point. In this way the fuel jets are introduced substantially tangentially into the vortex indicated in Fig. 1 in the direction of rotation of the latter and are caught individually by one of the vortexes indicated in Fig. 3, whereby a very rapid and complete penetration with fuel of the whole air charge is obtained.

The embodiment shown is supposed to be a four-stroke cycle engine with inlet and exhaust valves in the cover. For this purpose there have in the upper surface of the piston been provided recesses 9 and 10 which as to size and form correspond to the valve heads and permit the piston to get quite close to the latter and the cover in its upper dead point position. These recesses project partly in over the opening 8 of the combustion space and thereby contribute to creating a direct communication between the valve openings and the combustion space for the facilitation of the complete emptying of the latter of products of combustion. The invention may, however, also be applied in two-stroke cycle engines with inlet and exhaust valves in the cover or with one or more valves only for inlet or exhaust or without any valves at all in the cover.

The combustion space and the atomizer may be displaced transversely to the axis of the cylinder within certain limits determined by the constructive circumstances in each individual case, but as a rule it will prove most expedient to move the atomizer as far as possible out towards the periphery, the main part of the combustion space being hereby made to lie more centrally, and better room being provided for the mounting of valves and other accessories in the cover.

Within the scope of the invention more than one combustion space may be provided per cylinder.

I claim:

1. In internal combustion engines of the fuel injection type a generally pear-shaped combustion space lying completely sunk in the top portion of the engine piston with its longitudinal axis transverse to the axis of the engine cylinder and closer to the perpendicular to the piston axis than parallel thereto and opening through the top surface of the piston with a restricted pear-shaped aperture, the periphery of which in the voluminous portion of the combustion space runs substantially parallel to and inside the widest contour of the combustion space, the side walls of the combustion space diverging within the neck portion of said pear-shaped combustion space in the direction from the narrow towards the wider part thereof at an angle between 45° and 90°, whereas the side and bottom wall of said diverging neck portion is inclined down into the voluminous portion under a continuously decreasing angle not exceeding 60°, a fuel injecting nozzle mounted in the cylinder head having jet orifices adjacent the narrow end of the combustion space to deliver two fuel jets substantially parallel to the inclined side and bottom wall of the combustion space in the vicinity of the injection nozzle and substantially in planes bisecting the angles between the vertical longitudinal central plane of the combustion space and the contour thereof and symmetrically with respect to the vertical longitudinal central plane of the combustion space directed substantially along the axis of each of two vortices formed in the combustion space with their axes directed downwards along the inclined bottom of the combustion space tangentially into the lower portion of the further vortex movement formed in the voluminous part of the combustion space with axis transverse to said central plane.

2. In internal combustion engines of the fuel injection type as claimed in claim 1, inlet and exhaust valves in said cylinder head, the upper surface of the piston having recesses formed therein corresponding in shape and size to the heads of said valves, said recesses projecting partially in over said restricted aperture of said combustion space thereby forming a direct communication between the valve openings and the combustion space for facilitating a complete emptying of said combustion space of products of combustion.

OVE PETERSEN.

REFERENCES CITED

The following references are of record in the file of this patent:

FOREIGN PATENTS

| Number | Country | Date |
|--------|---------|------|
| 746,601 | France | June 2, 1933 |
| 503,201 | Great Britain | Mar. 30, 1939 |
| 521,954 | Great Britain | June 30, 1939 |